United States Patent
Schlesiger et al.

(10) Patent No.: US 9,239,579 B2
(45) Date of Patent: Jan. 19, 2016

(54) PRECISE ASCERTAINMENT OF ACTUATING POSITION FOR A MOTOR-DRIVEN VEHICLE PART

(71) Applicant: Brose Fahrzeugteile GmbH & Co. KG, Hallstadt, Hallstadt (DE)

(72) Inventors: Markus Schlesiger, Hallstadt (DE); Roland Kalb, Rossach (DE); Martin Lieb, Coburg (DE); Marcus Scholz, Lichtenfels (DE); Steffen Bauersachs, Bamberg (DE); Christoph Straub, Lautertal (DE); Detlef Russ, Ebersdorf (DE); Matthias Weidinger, Roedental (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 319 days.

(21) Appl. No.: 13/863,062

(22) Filed: Apr. 15, 2013

(65) Prior Publication Data

US 2013/0271059 A1  Oct. 17, 2013

(30) Foreign Application Priority Data

Apr. 14, 2012 (DE) .......................... 10 2012 008 235

(51) Int. Cl.
*H01P 1/00* (2006.01)
*G05B 24/02* (2006.01)

(52) U.S. Cl.
CPC .................................... *G05B 24/02* (2013.01)

(58) Field of Classification Search
CPC  E05Y 2900/55; H02P 7/0044; H02H 7/0851; E05F 15/1684
USPC ........................ 318/280, 282, 286, 443, 445
See application file for complete search history.

(56) References Cited

U.S. PATENT DOCUMENTS 5,436,539 A  * 7/1995  Wrenbeck et al. ............ 318/265
5,530,329 A  * 6/1996  Shigematsu et al. .......... 318/469
5,977,732 A    11/1999  Matsumoto (Continued)

FOREIGN PATENT DOCUMENTS

| DE | 196 32 139 C1 | 7/1997 |
|---|---|---|
| DE | 198 04 175 A1 | 9/1998 |
| DE | 10 2007 044 645 A1 | 4/2009 |

*Primary Examiner* — Rina Duda
(74) *Attorney, Agent, or Firm* — Muncy, Geissler, Olds & Lowe, P.C.

(57) ABSTRACT

In order to ascertain the actuating position of a vehicle part that is moved by an electric actuating motor via an actuating mechanism, an angle of rotation correlating with the number of motor shaft rotations during the actuation process or a motor signal correlated therewith are ascertained during an actuation process. An actuating position measure for the actuating position of the vehicle part is derived from the angle of rotation or the motor signal correlating therewith. During this process, an unloaded angle of rotation, through which the motor shaft rotates during an initial no-load phase of the actuation process without motion of the vehicle part is compensated by a predetermined correction term. The correction term is changed according to a stored dependency on a characteristic quantity for the age of the actuating mechanism.

7 Claims, 3 Drawing Sheets

(56) References Cited

U.S. PATENT DOCUMENTS

| | | | |
|---|---|---|---|
| 6,051,945 A * | 4/2000 | Furukawa | 318/280 |
| 6,150,785 A * | 11/2000 | Butscher et al. | 318/468 |
| 6,166,508 A | 12/2000 | Kalb | |
| 6,555,982 B2 * | 4/2003 | Tyckowski | 318/465 |
| 6,952,087 B2 * | 10/2005 | Lamm | 318/283 |
| 2008/0234894 A1 * | 9/2008 | Nomura et al. | 701/36 |
| 2012/0005963 A1 * | 1/2012 | Zellmer et al. | 49/358 |
| 2012/0209477 A1 * | 8/2012 | Ono et al. | 701/49 |

* cited by examiner

PRECISE ASCERTAINMENT OF ACTUATING POSITION FOR A MOTOR-DRIVEN VEHICLE PART

This nonprovisional application claims priority under 35 U.S.C. §119(a) to German Patent Application No. DE 10 2012 008 235.5, which was filed in Germany on Apr. 14, 2012, and which is herein incorporated by reference.

BACKGROUND OF THE INVENTION

1. Field of the Invention

The present invention relates to a method for ascertaining an actuating position of a vehicle part that can be moved by means of an electric actuating motor via an actuating mechanism. The invention also relates to an associated actuating device for automatically moving the vehicle part. The vehicle part to be moved is, in particular, a vehicle window. The actuating device is, in particular, an electric motor driven window regulator, preferably a cable window regulator.

2. Description of the Background Art

A conventional cable window regulator usually has an electric actuating motor whose motor shaft is coupled to the vehicle window to be moved. The actuating motor is typically driven by a control unit, e.g. composed of a microcontroller. The current actuating position of the window generally is calculated continuously by the control unit during each actuating operation, in particular in order to be able to move to specific window positions in a targeted way.

The actuating position of the window usually is derived by the control unit from the angle of rotation through which the actuating motor rotates during the actuation process. This angle of rotation and the speed of the motor shaft that can be derived therefrom are often measured directly. A Hall sensor that works together with a ring magnet attached to the motor shaft in a rotationally fixed manner is typically used for this purpose. Alternatively, the angle of rotation of the motor shaft can also be ascertained from the motor current, in particular by counting so-called current ripples.

It is disadvantageous that the "logical actuating position" of the vehicle window derived from the angle of rotation of the motor shaft usually matches the actual "mechanical" actuating position only to within a certain error. The reason for this, in particular, is that the actuating mechanism coupling the motor shaft to the window always has a certain system tolerance (also called "system slack"), as a result of which the window is only "soft-coupled" to the motor shaft.

A relatively high system tolerance normally occurs in cable window regulators. The system tolerance here is substantially dependent on the setting properties of the control cable, and for this reason is also referred to as "cable slack."

The system slack of a cable window regulator manifests itself to an especially marked degree during a reversal of the actuating direction, especially since the control cable here must be rewound from the state in which it is tensioned in the original direction until a sufficient tension has been established in the opposite direction in the control cable. During the rewinding, the motor shaft moves while the window to be moved remains stationary.

In the conventional methods for ascertaining the (logical) window position from Hall signal pulses or the counting of current ripples, the process of overcoming the system slack consequently results in a counting of pulses that are not correlated with a corresponding movement of the window. The logical window position is thus variable relative to the mechanical window position, which manifests itself as errors in approaching the desired window position. Since the count error associated with the system slack changes its sign with the actuating direction, a desired actuating position is approached differently from different actuating directions.

The error-prone positioning of the window by conventional cable window regulators is a substantial disadvantage for the so-called short-stroke function in particular, in which the window is moved out of the upper door seal of a frameless vehicle door in order to permit the vehicle door to be opened without resistance. Vehicle manufacturers often place tight limits on the short-stroke motion. This is intended to ensure that the window travels completely out of the window seal on the one hand, but on the other hand the window is not open too wide after the short stroke, especially since additional safety precautions, such as automatic pinch protection, are otherwise required in some cases by the applicable legal requirements for the reverse motion of the window.

However, a precise approach is desirable for other actuating positions of a window as well, in particular for approaching the upper or lower pre-shutoff points, where the window normally is stopped before actually reaching the (upper or lower) blocked state. Moreover, precise positioning of a window is also desirable when approaching the so-called RELAN (Relax After Normalization) point, for example. This term is understood to mean the particular window position to which the window is often moved back after adjustment travel to the upper or lower blocked state in order to release the tension in the actuating mechanism.

Apart from this, an ascertainment of the actuating position corrected for the influence of the system slack is also beneficial for other window regulator types as well as other actuating devices in a vehicle, in particular seat adjustments, door and roof actuators, etc.

Because the system slack in conventional cable window regulators changes primarily due to the age-related setting properties of the cable system, a cable tensioner is sometimes used in such window regulators that irreversibly adjusts itself in the event of elongation of the cable path, and thereby compensates for the age-related increase in the system slack. However, such a cable tensioner requires additional material and assembly expense, which it is desirable to avoid.

A method for numerical compensation of the system slack in controlling the motion of a window is known from DE 196 32 139 C1, which corresponds to U.S. Pat. No. 6,166,508, and which is incorporated herein by reference. Here, the period of the motor rotation is sensed in a time-resolved manner during an actuation process using motion signals of the actuating motor or motor shaft. An initial no-load phase of the actuation process, during which the motor shaft rotates while overcoming the system slack without motion of the vehicle part, is identified by comparison of the time-dependent period with a threshold. During the course of the prior art method, an actuating position measure for the actuating position of the window corrected by the motor rotation during the no-load phase is ascertained by the means that all motion signals before the threshold is exceeded are assigned to the system slack and accordingly are not evaluated for determining the actuating position measure.

SUMMARY OF THE INVENTION

It is therefore an object of the present invention to make it possible to ascertain precisely, but in a way that can be realized with especially simple means, the actuating position of a vehicle part that can be moved by an electric motor. In particular, it should be possible here to compensate in a simple and precise way for errors that result from overcoming the system slack.

According to an embodiment of the method, an angle of rotation correlating with the number of motor shaft rotations during the actuation process, or a motor signal correlated therewith, for example a number of current ripples of the motor current, are ascertained during an actuation process. An actuating position measure for the actuating position of the vehicle part is derived from the angle of rotation or the motor signal correlating therewith. During this process, an unloaded angle of rotation, through which the motor shaft rotates during an initial no-load phase of the actuation process without motion of the vehicle part, is compensated by means of a predetermined correction term. According to the invention, the correction term is changed according to a stored dependency on a characteristic quantity for the age of the actuating mechanism.

The method can be implemented advantageously in a manner that is especially uncomplicated mechanically and numerically. Tests have demonstrated that it additionally permits precise and failsafe compensation of the system slack over the lifetime of an actuating device, in particular a window regulator. The number of operating cycles, which is to say the number of actuation processes carried out using the actuating device, is preferably used as the characteristic quantity for the age of the actuating mechanism.

In an embodiment of the method, the correction term is increased linearly as a function of the characteristic quantity for the age of the actuating mechanism, in particular the number of operating cycles, until a predetermined maximum value is reached. In a useful embodiment of the method, the correction term is increased by a defined or parameterizable value (increment) each time a defined or parameterizable number of actuation processes has taken place, for example at intervals of 1000 actuation processes, in particular until the maximum value is reached. The increment is selectable, for example from a value range corresponding to a rotation of the motor shaft between 90° (one quarter rotation) and 1350° (15 quarter rotations). Once the maximum value has been reached, in contrast, the correction term is held at a value that is independent of the age of the actuating mechanism. In a useful dimensioning of the linear dependency of the correction term, the maximum value is reached after approximately 20,000 operating cycles, for example. The linear increase in the correction term that is limited by the maximum value can advantageously be implemented using extremely simple means.

In an alternative embodiment of the method, the correction term is increased according to a predefined logarithmic dependence on the characteristic quantity for the age of the actuating mechanism, in particular the number of operating cycles. The age-related change in the system slack can be compensated for in an especially precise manner by this means, as has been recognized.

In addition to the age-related change, the correction term preferably is varied as a function of a measured temperature value that contains information on the temperature prevailing at the location of the actuating mechanism. Within the scope of the invention, the measured temperature value here can be acquired through a measurement device by a temperature sensor internal to the device. However, it can also be obtained from on-board electronics of the vehicle external to the device. For temperature adjustment, the correction value preferably is varied linearly as a function of the measured temperature value.

The actuating device according to the invention includes an electric actuating motor, an actuating mechanism coupling the actuating motor to the vehicle part, and a control unit for driving the actuating motor. According to the invention, the control unit here is configured by programming and/or a circuit to automatically carry out the above method in one of its embodiments.

In an embodiment, at least the core of the control unit is composed of a microcontroller in which the method according to the invention is implemented by programming in the form of operating software, so that the method is automatically carried out when the operating software is executed in the microcontroller. The vehicle part to be moved is, in particular, a vehicle window. The actuating device is, in particular, a window regulator, preferably a cable window regulator, in which the actuating mechanism comprises a control cable.

The method according to the invention finds application in approaching the short-stroke position of the window regulator, in particular. In addition, the method is of particular advantage for defined actuation positions that can be approached from both actuating directions. Over and above the field of application of the window regulator, the method according to the invention can also be used to advantage in any other desired actuating devices in a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
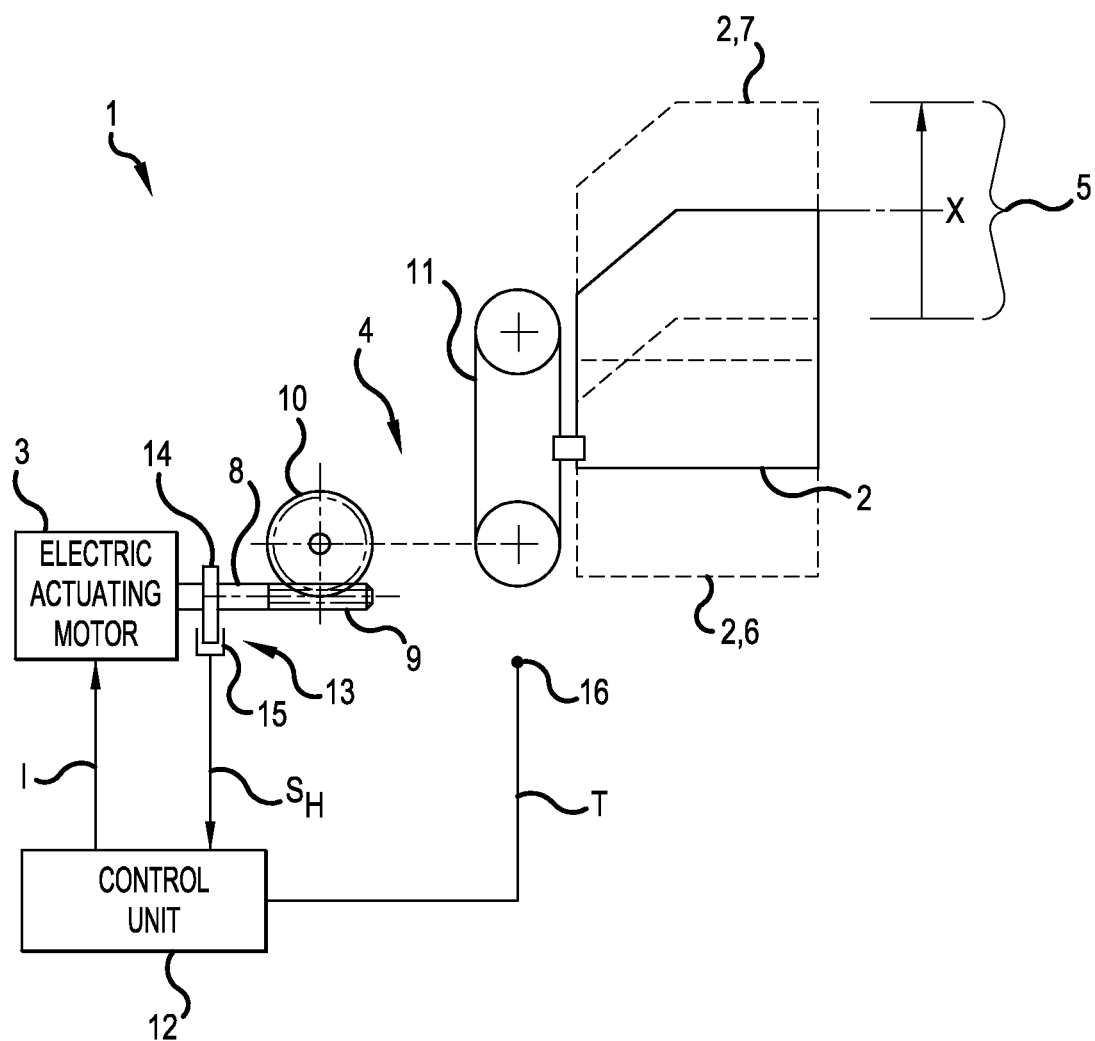
FIG. 1 is a schematic representation of a cable window regulator that has an electric actuating motor, a control unit, and an actuating mechanism comprising a control cable, and also of a vehicle window coupled to the control cable.

Corresponding parts and quantities are always labeled with the same reference characters in all the figures.

FIG. 1 schematically shows an actuating device in the form of a (cable) window regulator 1 for a (vehicle) window 2 of a motor vehicle.

The window regulator 1 comprises an electric actuating motor 3 that is mechanically coupled to the vehicle window 2 by an actuating mechanism 4 in such a way that the actuating motor 3 can cause the vehicle window 2 to travel reversibly along a travel path 5 between two end positions, namely an open position 6 and a closed position 7.

FIG. 1 shows the window 2 in the open position 6 and the closed position 7, using a dashed outline for each. A solid outline is used to show the window 2 in an intermediate actuating position x between the two end positions. The actuating position x has the value zero, for example, when the window 2 is in the closed position 7.

The actuating mechanism 4 comprises a drive worm 9 that is placed on a motor shaft 8 of the actuating motor 3 and that meshes with a worm gear 10. The actuating mechanism 4 additionally comprises a control cable 11—indicated in FIG. 1 only in a very simplified manner—that is coupled to the worm gear 10 by a transmission (not shown in detail). The control cable 11 is in turn coupled to the window 2 by means of a carrier.

The actuating device 1 additionally comprises a control unit 12 and a rotary position sensor 13. The rotary position sensor 13 comprises a multipole ring magnet 14 that is attached to the motor shaft 8 in a rotationally fixed manner, and also a Hall sensor 15 that works together with the magnet. During operation of the actuating motor 3, the ring magnet 14, which rotates together with the motor shaft 8 relative to the Hall sensor 15, generates together with the Hall sensor 15 a periodic oscillating pulse signal $S_H$, which is delivered to the control unit 12 by the Hall sensor 15 as an input quantity. During this process, by counting the (Hall) pulses of the pulse signal $S_H$, the control unit 12 calculates a quantity that is proportional to the number of rotations of the motor shaft 8 during an actuation process; this quantity is referred to below as angle of rotation $\phi$. By adding the angle of rotation $\phi$ to a stored initial value $x'_0$, the control unit 12 calculates a time-dependent logical actuating position of the window 2, which is referred to below as actuating position measure x'.

In addition to the actuating position measure x', the control unit 12 optionally calculates the speed n of the motor shaft 8 by counting the Hall pulses of the control signal $S_H$ per unit of time or by measuring the inter-pulse times.

The control unit 12 drives the actuating motor 3 by delivering a motor current I. The control unit 12, in turn, is supplied with electric power by a vehicle battery.

The window regulator 1 additionally comprises a temperature sensor 16, which senses a characteristic measured temperature value T for the ambient temperature of the actuating mechanism 4, which is to say the temperature inside the vehicle door, and supplies this value to the control unit 12 as an input quantity.

Figure 2:
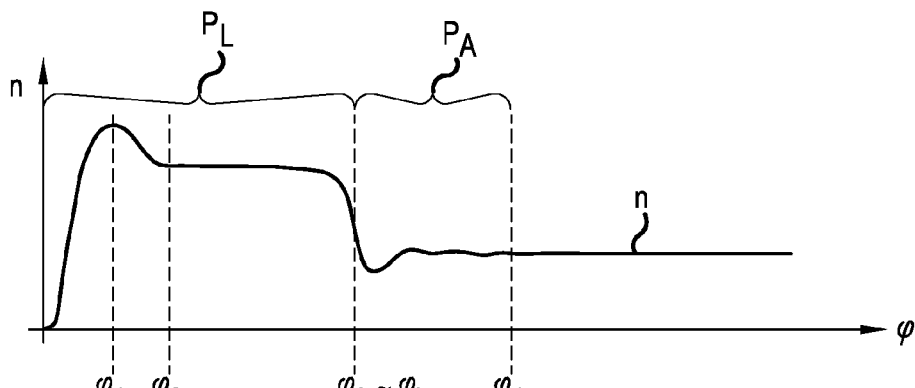
FIG. 2 is a graph of the curve of the speed of the actuating motor versus the angle of rotation of the motor shaft traveled in the ongoing actuation process.

In the initial phase of an actuation process, in which the window 2 is supposed to be moved from its closed position 7 towards the open position 6, for example, the speed n of the motor shaft 8 typically follows a curve such as is shown schematically as a function of the angle of rotation $\phi$ in FIG. 2. It is evident from this representation that the speed n rapidly rises to a high value immediately after startup of the actuating motor 3, especially since the rotation of the motor shaft 8 initially is supported by the actuating mechanism 4 that is still tensioned in the closing direction. After passing through a maximum speed at an angle of rotation $\phi_1$, the speed n drops to a plateau value—still relatively high—at an angle of rotation $\phi_2$. At an angle of rotation $\phi_3$ the initial tensioning of the actuating mechanism 4 is completely released. The control cable 11 is now rewound—at an approximately constant speed n—until the actuating mechanism 4, in particular the control cable 11, is sufficiently tensioned in the opening direction to be able to transmit sufficient force to move the window 2.

The startup of the window 2 is characterized by an abrupt rise in the motor load, which manifests itself in the speed curve in FIG. 2 as a sharp drop in the speed n at the angle of rotation $\phi_3$. The angle of rotation $\phi_3$, which in FIG. 2 marks the inflection point in the falling edge of the speed curve, coincides approximately—but usually not exactly—with the end of an initial no-load phase $P_L$ of the actuation process and the transition to a subsequent startup phase $P_A$, in which the window 2 begins to move. The startup phase $P_A$ ends at an angle of rotation $\phi_4$, at which the speed n of the actuating motor 3 has settled to a constant value.

The angle of rotation $\phi_3$ thus corresponds approximately—but again, usually not exactly—to the angle of rotation $\phi$, referred to below as the unloaded angle of rotation $\phi_L$, through which the motor shaft 8 is rotated during the no-load phase $P_L$ ($\phi_L \approx \phi_3$).

Figure 3:
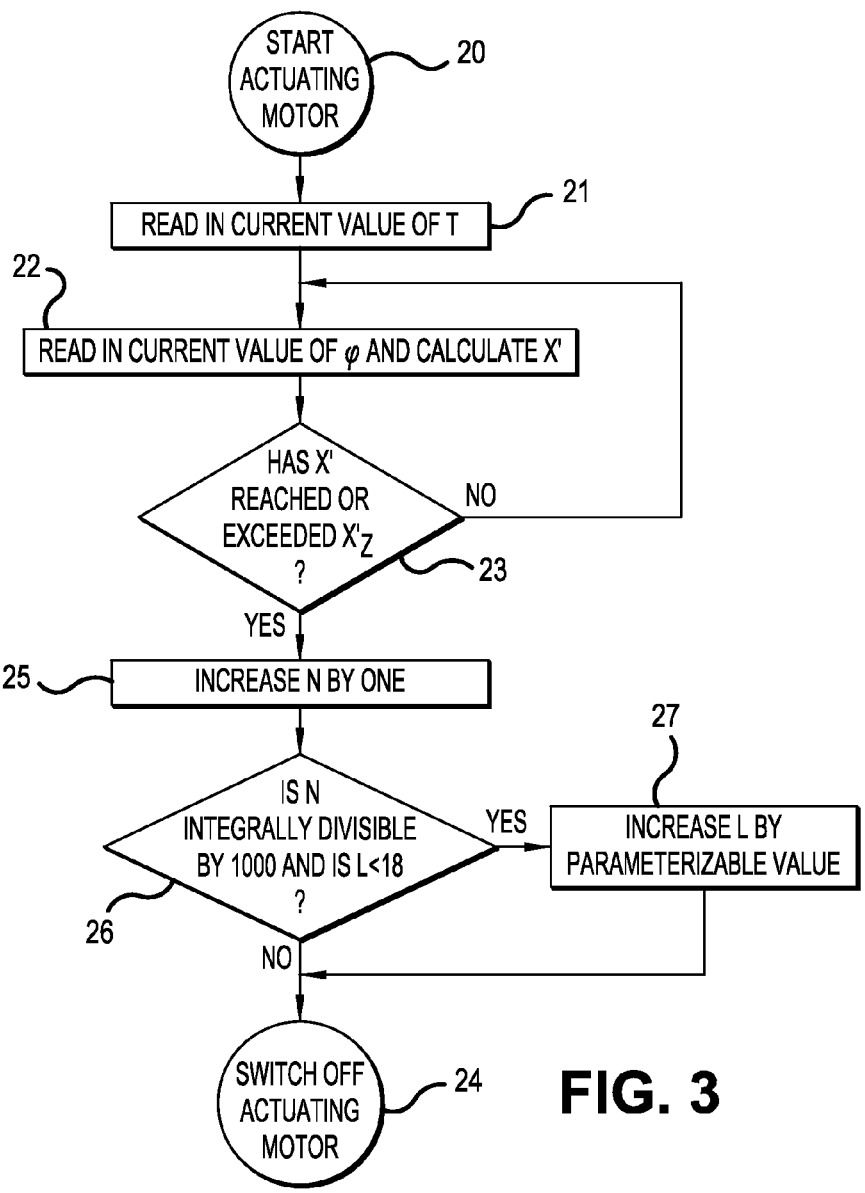
FIG. 3 is a simplified, schematic flowchart of a method for ascertaining the actuating position of the vehicle window carried out automatically by a control unit.

In order to determine the actuating position measure x' corrected for the unloaded angle of rotation $\phi_L$, the method shown in a simplified schematic fashion in FIG. 3 is implemented by software in the control unit 12.

During the course of this method, the control unit 12 initially starts the actuating motor 3 in a first (method) step 20, immediately setting the motor shaft 8 in rotation.

In a next (method) step 21, the control unit 12 reads in a current value of the measured temperature value T.

In a next (method) step 22, the control unit 12 reads in a current value of the angle of rotation $\phi$. From the angle of rotation $\phi$ the control unit 12 calculates the actuating position measure x' using $$x' = x'_0 + r \cdot c \cdot (\phi - K).\qquad\text{Eq. 1}$$

Here, the parameter r in Eq. 1 has the value +1 for an actuating motion in the opening direction, and the value −1 for an actuating motion in the closing direction. The parameter c stands for an empirically determined proportionality constant.

The parameter K is a correction term that compensates for the influence of the unloaded angle of rotation $\phi_L$, and that accordingly is chosen such that it corresponds as precisely as possible to the actual unloaded angle of rotation $\phi_L$ within the framework of a modeling function taken as a basis ($K \approx \phi_L$).

The control unit 12 calculates this correction term K using $$K = F(T) \cdot (K_0 + L)\qquad\text{Eq. 2}$$

The parameter F(T) in Eq. 2 represents a function that depends on the measured temperature value T and models the temperature dependence of the unloaded angle of rotation $\phi_L$. For this (temperature compensation) parameter F(T), a linear dependency, in particular, of the form $$F(T) = \alpha \cdot T + \beta\qquad\text{Eq. 3}$$

is stored in the control unit 12, wherein $\alpha$ and $\beta$ are constants that are empirically adjusted (which is to say, through experimentation) for the relevant window regulator type. However, it generally is also possible within the scope of the invention to optimize the constants $\alpha$ and $\beta$ separately for each individual window regulator 1.

The parameter $K_0$ in Eq. 2 is a stored constant that models the unloaded angle of rotation $\phi_L$ of the window regulator 1 in factory new condition. This quantity, too, can be optimized empirically (which is to say, through experimentation) for the relevant window regulator type or be optimized separately for each individual window regulator 1, as desired, within the scope of the invention.

Finally, the parameter L in Eq. 2 models the age-dependent change in the system slack, and hence in the unloaded angle of rotation $\phi_L$. In principle, this quantity can be implemented in the control unit 12 as a functional dependency—analogous to the (temperature compensation) parameter F(T)—that is calculated anew at every program run. However, since the (aging compensation) parameter L is a slowly changing quantity, it is preferable in software terms for this parameter to be stored as a variable with a persistent value (which is to say a value lasting beyond the program run).

In a (method) step 23, the control unit 12 now checks whether the actuating position measure x' determined using Eq. 1 has reached or exceeded a predetermined target value $x'_z$ ($r \cdot x' \geq r \cdot x'_z$?). As long as this condition is not met (N), and thus the window 2 has not yet reached its target position, the control unit 12 branches back to step 22. Otherwise (YES), the control unit 12 terminates the current actuation process by switching off the actuating motor 3 in a (method) step 24.

Simultaneously, subsequently, or—as shown by way of example in FIG. 3—beforehand, in a (method) step 25 the control unit 12 increases a variable called the operating cycle counter N by one counting unit, in particular by the value one.

In a next (method) step 26, the control unit 12 checks whether the value of the operating cycle counter N is integrally divisible by the number 1000 (N mod 1000=0?). In the foregoing parenthetical expression, "mod" stands for the mathematical "modulo" function, which returns the integer remainder of the division N/1000. The expression N mod 1000 has the value zero only when the operating cycle counter N is integrally divisible by 1000 (which is to say for N=1000, 2000, 3000, . . . ).

In addition, the control unit 12 checks in step 26 whether the parameter L falls below a defined maximum value, for example 18 quarter rotations of the motor shaft 8, (L<18?).

If both conditions are met at the same time (Yes), in a (method) step 27 the control unit 12 increases the parameter L by a parameterizable value, for example by the value (L=L+1) corresponding to one quarter rotation of the motor shaft 8. Otherwise (NO), the control unit 12 leaves the value of the parameter L unchanged.

Figure 4:
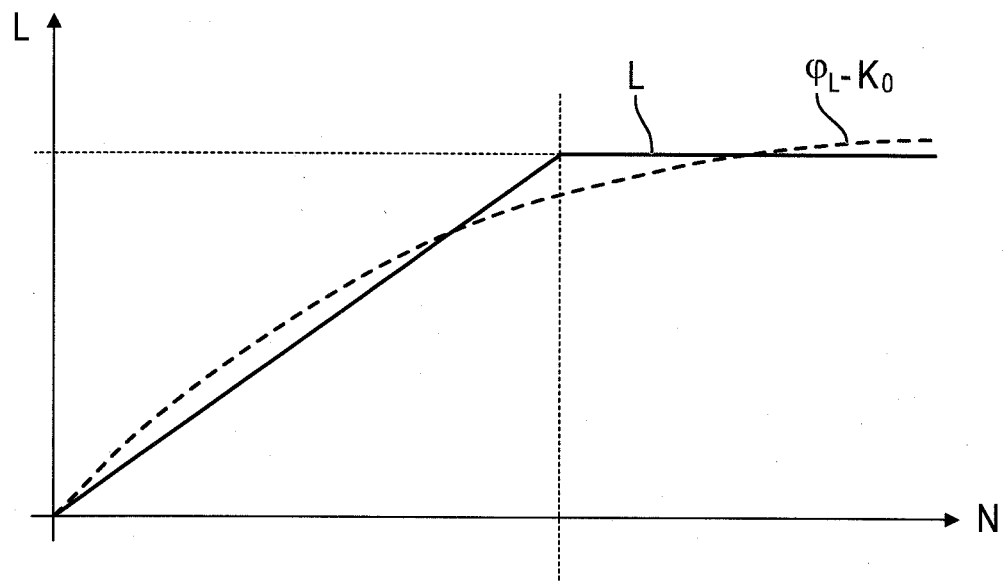
FIG. 4 is a graph of the age-dependent change of a correction term used during the course of a first variant embodiment of the method for ascertaining the actuating position, as a function of the number of actuation processes (operating cycles) carried out by the actuating device.

Because of the regular increase, the result for the parameter L over the lifetime of the window regulator 1 is a linear dependence, as shown in FIG. 4, on the number of operating cycles, and consequently also the value of the operating cycle counter N, which transitions to a constant upon reaching the maximum value. For comparison, FIG. 4 schematically shows the lifetime-dependent change in the unloaded angle of rotation $\phi_L$ minus the constant parameter $K_0$.

In a variant of the method, the parameter L is not linear, but instead has a logarithmic dependence on the value of the operating cycle counter N according to $$L = \gamma \cdot \log(\delta \cdot N + 1), \qquad \text{Eq. 4}$$

where the parameters $\gamma$ and $\delta$ are constants that are adjusted empirically (which is to say, through experimentation) for the relevant window regulator type or are optimized separately for each individual window regulator 1, as desired.

Figure 5:
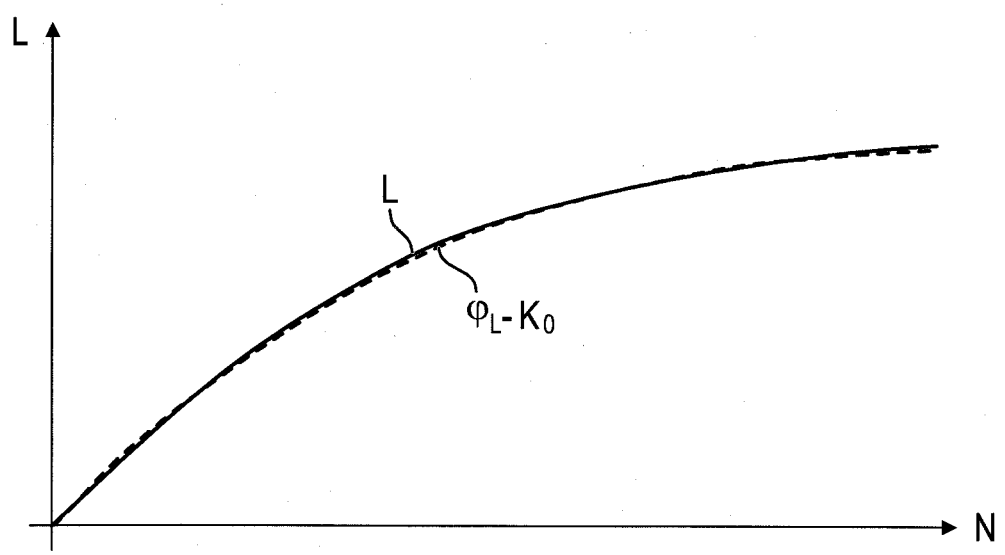
FIG. 5 illustrates in a representation as in FIG. 4, the age-dependent change of a correction term used during the course of a second variant embodiment of the method for ascertaining the actuating position.

In this method variant, it is useful for the steps 26 and 27 to be replaced by a functional block that recalculates the parameter L using Eq. 4 at every program run. In FIG. 5, the curve of the parameter L as a function of the operating cycle counter N is again schematically compared to the lifetime-dependent change in the unloaded angle of rotation $\phi_L$ minus the constant parameter $K_0$.

The variants of the method described above are applied to all actuation processes carried out with the actuating device 1 and are used, in particular, for precisely approaching the short-stroke position.

The subject matter of the invention is not limited to the exemplary embodiments described above. Rather, additional embodiments of the invention can be derived from the above description by one skilled in the art. In particular, the order of the above-described steps can be switched without deviating from the invention. Moreover, steps can be combined or divided and the specified formulas can be used in mathematically transformed forms within the scope of the invention.

What is claimed is:

1. A method for ascertaining an actuating position of a vehicle part that is moveable by an electric actuating motor via an actuating mechanism, the method comprising:
    ascertaining an angle of rotation correlating a number of motor shaft rotations during an actuation process or a motor signal correlated therewith during the actuation process;
    deriving an actuating position measure for the actuating position of the vehicle part from the angle of rotation or the motor signal correlating therewith,
    compensating an unloaded angle of rotation, through which the motor shaft rotates during an initial no-load phase of the actuation process without motion of the vehicle part via a predetermined correction term; and
    changing the correction term according to a stored dependency on a characteristic quantity for the age of the actuating mechanism,
    wherein the correction term is increased linearly as a function of the characteristic quantity for the age of the actuating mechanism until a predetermined maximum value is reached and once the predetermined maximum value is reached, the corrective term is held at a value that is independent of the age of the actuating mechanism.

2. The method according to claim 1, wherein the number of actuation processes carried out using the actuating mechanism is used as a characteristic quantity for an age of the actuating mechanism.

3. The method according to claim 1, wherein the correction term is increased by a defined or parameterizable value each time a defined or parameterizable number of actuation processes has taken place until the maximum value is reached.

4. The method according to claim 1, wherein the correction term additionally is varied as a function of a measured temperature value.

5. The method according to claim 4, wherein the correction term is varied linearly as a function of the measured temperature value.

6. An actuating device for automatically moving a vehicle part, the actuating device comprising:
    an electric actuating motor;
    an actuating mechanism that couples the actuating motor to the vehicle part; and
    a control unit for driving the actuating motor,
    wherein the control unit is configured to automatically carry out the method according to claim 1.

7. The actuating device according to claim 6, wherein the actuating mechanism comprises a control cable.

* * * * *